United States Patent
Nissilä

(10) Patent No.: US 11,984,963 B2
(45) Date of Patent: May 14, 2024

(54) RADIO DEVICES WITH SWITCHABLE ANTENNAS

(71) Applicant: Nordic Semiconductor ASA, Trondheim (NO)

(72) Inventor: Mauri Nissilä, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 372 days.

(21) Appl. No.: 17/312,910

(22) PCT Filed: Dec. 10, 2019

(86) PCT No.: PCT/EP2019/084456
§ 371 (c)(1),
(2) Date: Jun. 10, 2021

(87) PCT Pub. No.: WO2020/120487
PCT Pub. Date: Jun. 18, 2020

(65) Prior Publication Data
US 2022/0069885 A1 Mar. 3, 2022

(30) Foreign Application Priority Data
Dec. 11, 2018 (GB) .................................. 1820161

(51) Int. Cl.
*H04B 7/08* (2006.01)
*H04B 7/06* (2006.01)
*H04L 1/00* (2006.01)

(52) U.S. Cl.
CPC ......... *H04B 7/0805* (2013.01); *H04B 7/0604* (2013.01); *H04B 7/0667* (2013.01); *H04B 7/0885* (2013.01); *H04L 1/0047* (2013.01)

(58) Field of Classification Search
CPC .. H04B 7/0805; H04B 7/0604; H04B 7/0667; H04B 7/0885; H04L 1/0047; H04L 1/06; H04L 1/08
See application file for complete search history.

(56) References Cited

U.S. PATENT DOCUMENTS 8,054,920 B2 * 11/2011 Furman ................... H04L 1/08
329/304
8,121,097 B2 * 2/2012 Li .......................... H04L 5/0007
370/347

(Continued)

FOREIGN PATENT DOCUMENTS

AU 2017262847 B2 * 4/2020 ........... H04B 7/0486
CN 86100949 A * 10/1986 ............... H04B 7/04
(Continued)

OTHER PUBLICATIONS

Feltrin et al., "NarrowBand-IoT: A Survey on Downlink and Uplink Perspectives," *IEEE Wireless Communications*, vol. 26, Issue: 1, Feb. 2019, pp. 78-86.

(Continued)

*Primary Examiner* — Berhanu Tadese
(74) *Attorney, Agent, or Firm* — Klarquist Sparkman, LLP (57) ABSTRACT

A radio device receives data from a base station that transmits a first radio signal, carrying a first data block, in a first time window, and a second radio signal, also carrying the first data block, in a different, second time window. The radio device comprises first and second antennas, receive circuitry, and a switch for selectively connecting the receive circuitry to the first antenna or to the second antenna. It is configured to sample the first radio signal, received by the first antenna in the first time window, to generate first sampled data; disconnect the first antenna from the receive circuitry and connect the second antenna; sample the second (Continued)

radio signal, received by the second antenna in the second time window, to generate second sampled data; and use both the first sampled data and the second sampled data to decode the first data block.

18 Claims, 4 Drawing Sheets

(56) References Cited

U.S. PATENT DOCUMENTS

| | | | | |
|---|---|---|---|---|
| 8,743,823 | B2* | 6/2014 | Richardson | H04W 74/0825 |
| | | | | 370/468 |
| 9,693,351 | B2* | 6/2017 | Learned | H04L 1/24 |
| 9,930,567 | B1* | 3/2018 | Beard | H04L 1/08 |
| 10,135,587 | B2* | 11/2018 | Wang | H04L 25/0224 |
| 10,263,661 | B2* | 4/2019 | Rasmussen | H04L 1/08 |
| 10,367,677 | B2* | 7/2019 | Parkvall | H04W 24/10 |
| 10,419,970 | B2* | 9/2019 | Beard | H04B 1/713 |
| 11,082,962 | B2* | 8/2021 | Park | H04L 27/2602 |
| 11,387,980 | B2* | 7/2022 | Junttila | H04L 9/0618 |
| 11,424,539 | B2* | 8/2022 | Alpman | H01L 25/16 |
| 11,456,854 | B2* | 9/2022 | Kutti | H04L 9/002 |
| 11,477,052 | B2* | 10/2022 | Östman | H04L 25/022 |
| 11,544,413 | B2* | 1/2023 | Aune | G06F 21/72 |
| 2010/0041355 | A1 | 2/2010 | Laroia et al. | |
| 2010/0190459 | A1* | 7/2010 | Li | H04W 52/383 |
| | | | | 455/234.1 |
| 2012/0163486 | A1 | 6/2012 | Yim et al. | |
| 2021/0160055 | A1* | 5/2021 | Tiikkainen | H04L 9/0625 |
| 2021/0216665 | A1* | 7/2021 | Winblad | G06F 13/28 |
| 2021/0266197 | A1* | 8/2021 | Östman | H04L 25/022 |
| 2022/0061060 | A1* | 2/2022 | Tiri | H04W 4/70 |
| 2022/0069885 | A1* | 3/2022 | Nissilä | H04B 7/0805 |
| 2022/0103407 | A1* | 3/2022 | Corbishley | H04L 27/14 |
| 2023/0198691 | A1* | 6/2023 | Berg | H04L 5/0051 |
| | | | | 370/330 |

FOREIGN PATENT DOCUMENTS

| | | | | |
|---|---|---|---|---|
| CN | 1717889 | B * | 5/2011 | H04B 7/0669 |
| CN | 105493433 | A * | 4/2016 | H04B 17/309 |
| CN | 105493433 | B * | 1/2019 | H04B 17/309 |
| CN | 108352927 | B * | 8/2019 | G10L 19/005 |
| CN | 108352928 | B * | 8/2019 | G10L 19/005 |
| CN | 110447146 | A * | 11/2019 | H01L 23/4855 |
| CN | 110582976 | A * | 12/2019 | H04B 1/713 |
| CN | 110582976 | B * | 5/2022 | H04B 1/713 |
| CN | 114615699 | A * | 6/2022 | H04B 7/0486 |
| CN | 114944903 | A * | 8/2022 | H04B 1/713 |
| CN | 109588064 | B * | 11/2022 | H04B 7/0486 |
| CN | 115804049 | A * | 3/2023 | H04L 27/2613 |
| CN | 115989486 | A * | 4/2023 | G06F 15/7867 |
| DE | 112017006442 | T5 * | 9/2019 | H01L 23/4855 |
| EP | 0 740 430 | A2 | 10/1996 | |
| EP | 1 315 325 | A1 | 5/2003 | |
| EP | 2476275 | A1 * | 7/2012 | H04W 16/14 |
| EP | 2663982 | A1 * | 11/2013 | H04B 1/0082 |
| EP | 3 253 163 | A1 | 12/2017 | |
| EP | 3414854 | A1 * | 12/2018 | H04B 17/309 |
| EP | 3681197 | A1 * | 7/2020 | H04B 7/0486 |
| EP | 3681197 | B1 * | 1/2022 | H04B 7/0486 |
| EP | 3605933 | B1 * | 3/2022 | H04B 1/713 |
| EP | 3998736 | A1 * | 5/2022 | H04B 1/713 |
| EP | 4009556 | A2 * | 6/2022 | H04L 1/0045 |
| EP | 4021066 | A1 * | 6/2022 | H04B 7/0486 |
| ES | 2908247 | T3 * | 4/2022 | H04B 7/0486 |
| GB | 2434064 | A * | 7/2007 | H04B 1/7176 |
| GB | 2560806 | A * | 9/2018 | H03D 7/1441 |
| GB | 2574642 | A * | 12/2019 | H04L 9/0625 |
| GB | 2599139 | A * | 3/2022 | H03M 13/41 |
| JP | 2979064 | B2 * | 11/1999 | H04B 7/04 |
| JP | 3186733 | B2 * | 7/2001 | H04B 7/04 |
| JP | 2005295516 | A * | 10/2005 | H04B 1/0064 |
| JP | 4715237 | B2 * | 7/2011 | H04B 1/0064 |
| JP | 6623298 | B2 * | 12/2019 | G01S 13/003 |
| JP | 6705938 | B2 * | 6/2020 | H04L 1/08 |
| JP | 6871949 | B2 * | 5/2021 | H04B 7/0486 |
| JP | 7089519 | B2 * | 6/2022 | H01L 23/4855 |
| MY | 189669 | A * | 2/2022 | H04B 7/0486 |
| RU | 2761349 | C2 * | 12/2021 | H04L 1/08 |
| WO | WO-9613914 | A2 * | 5/1996 | H03G 3/3042 |
| WO | WO-2016079632 | A1 * | 5/2016 | |
| WO | WO-2017196249 | A1 * | 11/2017 | H04B 7/0486 |
| WO | WO-2018062845 | A1 * | 4/2018 | H04B 7/0695 |
| WO | WO-2018119153 | A2 * | 6/2018 | H01L 23/4855 |
| WO | WO-2018169347 | A1 * | 9/2018 | H04L 1/08 |
| WO | WO-2018203682 | A1 * | 11/2018 | H04B 1/713 |
| WO | WO-2019238790 | A1 * | 12/2019 | H04L 9/0625 |
| WO | WO-2020120487 | A1 * | 6/2020 | H04B 7/0604 |
| WO | WO-2021228844 | A1 * | 11/2021 | H04L 27/2613 |
| WO | WO-2022023044 | A1 * | 2/2022 | G06F 15/7867 |

OTHER PUBLICATIONS

International Search Report and Written Opinion for PCT/EP2019/084456, dated Feb. 24, 2020, 21 pages.
IPO Search Report under Section 17(5) for GB1820161.6, dated May 23, 2019, 4 pages.
SONY: "Reliable PDCCH operation for NR", 3GPP Draft; R1-1716248—Reliable PDCCH Operation for NR, 3rd Generation Partnership Project (3GPP), Mobile Competence Centre ; 650, Route Des Lucioles ; F-06921 Sophia-Antipolis Cedex ; France., 9 vol. TSG RAN, No. Nagoya, Japan; Sep. 18, 2017-Sep. 21, 2017, Sep. 17, 2017 (Sep. 17, 2017), XP051339705, Retrieved from the Internet: URL:http://www.3gpp.org/ftp/Meetings_3GPP_ SYNC/RAN1/Docs/, [retrieved on Sep. 17, 2017], Sections 1 and 2, 6 pages.

* cited by examiner

RADIO DEVICES WITH SWITCHABLE ANTENNAS

CROSS REFERENCE TO RELATED APPLICATIONS

This is the U.S. National Stage of International Application No. PCT/EP2019/084456, filed Dec. 10, 2019, which was published in English under PCT Article 21(2), which in turn claims the benefit of Great Britain Application No. 1820161.6, filed Dec. 11, 2018.

BACKGROUND OF THE INVENTION

This invention relates to radio devices, radio system, and methods and software for operating the same.

Cellular radio communication systems can often experience interference—e.g., due to multipath effects—which can result in a radio receiver failing to decode a transmitted message correctly. This can be mitigated by transmitting multiple copies of the same information at different times (time diversity) and/or on different frequencies (frequency diversity). This increases the likelihood of the receiver accurately decoding the transmitted information, even in the presence of transient and/or frequency-specific inference. Under suitable conditions, the channel gain may rise approximately linearly with repetition—e.g., a 3 dB coverage gain with each doubling of the repetition count.

Time diversity is used extensively in implementations of the 3GPP Long Term Evolution (LTE) Cat-M1 and Narrowband Internet-of-Things (NB-IoT) cellular radio protocols in order to send data reliably in a Machine Type Communications (MTC) context, even where there is very weak signal strength, such as deep inside a large building complex. MTC devices, such as wireless sensors, typically only need to send and receive relatively small amounts of data (compared with an LTE smartphone device, for example), so the reduction in channel capacity and latency due to high repetitions is an acceptable trade-off for increased reliability. In some cases, the same data transport block may be sent up to 2,048 times. LTE Cat-M1 and NB-IoT also both use frequency hopping to mitigate interference on specific wavelengths, such as multipath fading (destructive interference). User equipment (UE) may informed by the network of a particular repetition rate and/or frequency hopping pattern to follow—e.g., through information contained in System Information Blocks (SIB) or Downlink Control Indicators (DCI).

LTE also provides for Single Input Multiple Output antenna diversity for downlink (mobile-terminating) communications, whereby user equipment (UE), such as a mobile telephone, contains multiple receive antennas and combines information derived from the signals received simultaneously at each antenna—e.g., using maximum ratio combining—in order recover a more robust signal. However, such antenna-combining is complex to implement, and is therefore not typically used in data-only, machine-type communication devices such as wireless sensors and Internet-of-Things appliances.

The present invention seeks to address this shortcoming.

SUMMARY OF THE INVENTION

From a first aspect, the invention provides a radio device for receiving data from a base station that transmits a first radio signal, carrying a first data block, in a first time window, and transmits a second radio signal, also carrying said first data block, in a second time window, different from the first time window, wherein the radio device comprises a first antenna, a second antenna, receive circuitry, and a switch for selectively connecting the receive circuitry to the first antenna or to the second antenna;

and wherein the radio device is configured to:
   connect the first antenna to the receive circuitry;
   sample the first radio signal, received by the first antenna in the first time window, to generate first sampled data;
   disconnect the first antenna from the receive circuitry and connect the second antenna to the receive circuitry;
   sample the second radio signal, received by the second antenna in the second time window, to generate second sampled data; and
   use both the first sampled data and the second sampled data to decode the first data block.

From a second aspect, the invention provides a radio system comprising such a radio device and such a base station.

From a third aspect, the invention provides a method of operating a radio device to receive data from a base station, wherein the base station transmits a first radio signal, carrying a first data block, in a first time window, and transmits a second radio signal, also carrying said first data block, in a second time window, different from the first time window, and wherein the radio device comprises a first antenna, a second antenna, receive circuitry, and a switch for selectively connecting the receive circuitry to the first antenna or to the second antenna, the method comprising the radio device:
   connecting the first antenna to the receive circuitry;
   sampling the first radio signal, received by the first antenna in the first time window, to generate first sampled data;
   disconnecting the first antenna from the receive circuitry and connecting the second antenna to the receive circuitry;
   sampling the second radio signal, received by the second antenna in the second time window, to generate second sampled data; and
   using both the first sampled data and the second sampled data to decode the first data block.

From a fourth aspect, the invention provides a method of operating a radio system comprising a base station and a radio device, wherein the radio device comprises a first antenna, a second antenna, receive circuitry, and a switch for selectively connecting the receive circuitry to the first antenna or to the second antenna,
the method comprising the base station:
   transmitting a first radio signal, carrying a first data block, in a first time window; and
   transmitting a second radio signal, also carrying said first data block, in a second time window,
the method further comprising the radio device:
   connecting the first antenna to the receive circuitry;
   sampling the first radio signal, received by the first antenna in the first time window, to generate first sampled data;
   disconnecting the first antenna from the receive circuitry and connecting the second antenna to the receive circuitry;
   sampling the second radio signal, received by the second antenna in the second time window, to generate second sampled data; and using both the first sampled data and the second sampled data to decode the first data block.

Thus it will be seen that, in accordance with the invention, a radio device receives a repeated data block on two different occasions, using a different respective receive antenna each time, and uses the signals from both antennas when decoding the data block. In this way, the radio device can achieve an antenna-diversity gain without having to receive a radio signal simultaneously on two antennas. This allows the radio device to use simpler receive circuitry than would be required for simultaneous reception, as more of the receive circuitry can be shared between both antennas, rather than having to be duplicated. This can reduce the size and cost of the radio device. It may also lead to a lower power consumption than would be required by conventional simultaneous-reception antenna-combining approaches.

The first and second radio signals may have a common carrier frequency, or they may have different carrier frequencies (e.g., being transmitted on different narrowband channels, or subcarrier frequencies, in an orthogonal frequency-division multiplexing (OFDM) system).

The first time window and the second time window are preferably non-overlapping. The base station may transmit more than two instances of the first data block—e.g., four, sixteen, or even 2048 or more instances. The instances are preferably transmitted in respective, non-overlapping time windows. They may be transmitted contiguously in time (i.e., without gaps), although this is not essential.

The first data block is preferably modulated on each radio signal using a common modulation scheme—e.g., phase-shift keying (PSK). The data in the first data block is preferably encoded identically on each radio signal.

The first antenna and second antenna may be spaced apart by more or less than one wavelength, or half a wavelength, of the first radio signal (e.g., more or less than around 12 cm or 6 cm for a 2.5 GHz carrier frequency). The antennas may be parallel or perpendicular or at any other angle. They are preferably of the same length, although this need not be so in all embodiments. It will be appreciated that the radio device does not use the first and second antenna simultaneously (e.g., to apply receive-side beam-forming) when receiving the second radio signal, as the first antenna is disconnected from the receive circuitry when the second radio signal is received.

The switch may be arranged so that only one of the first and second antennas can be connected to the receive circuitry at a time. The radio device may be configured so that the second antenna is disconnected from the receive circuitry whenever the first antenna is connected to the receive circuitry. The radio device may be configured so that the first antenna is disconnected from the receive circuitry whenever the second antenna is connected to the receive circuitry.

Switching antennas when receiving a repeated data block has been found to provide an increase in gain in appropriate situations, by mitigating a potential reduction in signal strength which may be experienced by only one of the antennas—e.g., due to multipath interference, or due to the proximity of an external radio-energy absorbing object to one of the antennas.

The radio device may comprise further antennas—e.g., a third and/or fourth antenna. It may be configured to connect one (and preferably only one) of the antennas to the receive circuitry at a time. The switch may be configured for selectively connecting the receive circuitry to any one of the antennas.

The radio device may, of course, also comprise other antennas that are not connectable to the receive circuitry, such as transmit antennas. The first and/or second antenna may also serve as transmit antennas and may be connected to transmit circuitry even when they are disconnected from the receive circuitry.

The switch may be controlled by a controller on the radio device. The controller may be implemented solely in hardware (e.g., a logic state machine) or may be implemented at least partly in software.

The various instances of the first data block may be received on the antennas according to a temporal antenna-switching pattern. The radio module may be configured to use two or more different switching patterns; it may determine a switching pattern to use for receiving the first data block depending on one or more criteria. The switching patterns may be predetermined—e.g., stored in a memory of the radio device—or they may be received by the radio device, e.g., from the base station. The criteria may relate to any one or more of: what radio protocol the radio signals are transmitted in accordance with; the timing of the data block transmissions; the carrier frequencies of the radio signals carrying the data block instances; a frequency hopping pattern of the radio signals carrying the data block instances; and a measured signal strength of one or more of the radio signals carrying the first data block, or of one or more carrier frequencies of the radio signals carrying the first data block.

The radio device may be configured to evaluate a signal quality (e.g., signal strength) measure for each of one or more of the antennas. It may determine the measure for a respective radio signal carrying the first data block, received by the respective antenna. It may determine the measures using radio signals received in different, but preferably adjacent, time windows for the respective antennas. It may determine an antenna-switching pattern at least partly in dependence on the signal quality measure or measures. It may be configured to identify an antenna of the one or more antennas that has a highest signal quality measure. The radio device may then use the identified antenna (and optionally only the identified antenna) to receive one or more instances of the data block. It may use the identified antenna (optionally exclusively for receiving a plurality of successive radio signals carrying the data block) until a condition is met, which may be that a final instance of the data block has been received and/or that a predetermined time period has elapsed and/or that a predetermined number of further instances have been received. The radio device may evaluate the signal quality measure, and identify a best antenna, repeatedly at intervals while receiving copies of the same first data block. It may use the identified antenna until the next evaluation of the signal quality measure. The radio device may be further configured to use the identified antenna exclusively only when the signal quality measure for the identified antenna satisfies a further criterion (in addition to being the highest quality)—such as having a quality measure that is more than a threshold amount above the next-highest signal quality measure for the other antenna or antennas. When the further criterion is not met, the radio device may use a predetermined antenna switching pattern when receiving the next one or more instances of the data block (e.g., until the next scheduled evaluation of the signal quality measure).

Although the embodiments have been described with reference to receiving a first data block, it will be understood that the radio device may be configured to receive many data blocks, some of which may be transmitted repeatedly, and some of which may be transmitted only once. The antenna switching may be used when receiving some or all of the data blocks that are transmitted more than once, in different time windows.

The receive circuitry may comprise any one or more of: an amplifier, a mixer, a filter, an analog-to-digital converter, memory, and a demodulation module. By having some or all of these components switchably connectable to the first and second antennas, rather than permanently connected, duplication of these elements can be avoided. The receive circuitry may be configured to tune a desired frequency band. It may be configured to mix a received radio signal to an intermediate frequency or to baseband. It may store sampled data in a buffer. It may demodulate the first or second sampled data to generate first or second demodulated data. The radio device may comprise a decoder for decoding the first data block from the first and second sampled data—e.g., from such first and second demodulated data.

The first and second sampled data may be of the same length (e.g. an equal number of samples and/or symbols).

The radio device may use the sampled data from multiple instances of the same data block to decode the data in any appropriate way. In some embodiments, the waveforms of all the received instances may be combined (e.g., averaged) before the averaged signal is demodulated and decoded. In other embodiments, a combining process may be used to decode the first data block from the first and second sampled data. The first sampled data and the second sample data may be demodulated separately. Combining may comprise applying a linear function to the first and second sampled data or corresponding demodulated data. The first and second data may be sample-aligned or symbol-aligned and the combining operation may be applied independently for each sample position, or for each symbol (e.g., bit) position.

For example, a received data block may be demodulated, and demodulated data may be stored in a buffer on the radio device. A second instance of the same data block may then be demodulated and combined with the contents of the buffer (including with the first instance of the data block) by scaling the second instance and adding it, sample-wise, to the first instance. This combined signal may be stored in the buffer (or a different buffer). When a third or further instance (copy) of the data block is received, this may be similarly scaled and added to the contents of the buffer. The process may be repeat for as many instances of the same block as are received by the radio device. After all the copies of the data are received, the combined data may be read from the buffer and may be decoded by a decoder in order to obtain the transmitted data bits.

In any of the aspects disclosed herein, the base station may be a base station of a radio access network. The radio access network may comprise a plurality of base stations. It may be a packet-switched cellular telecommunications data network. It may support a version of the 3GPP LTE (Long Term Evolution) standard. The base station may be a 3GPP evolved Node B (eNodeB) base station.

The radio device may use any standard or proprietary radio protocol to communicate with the base station. In one set of embodiments, the radio device implements a version of the 3GPP LTE (Long Term Evolution) standard. The radio device may be a cell phone or other human communication device. However, in a preferred set of embodiments, it is a non-voice communication device, such as a machine-to-machine (M2M) device—e.g., a wireless sensor or controller. It may implement a Machine-Type Communications (MTC) radio protocol such as LTE Cat-M1 or Narrowband Internet-of-Things (NB-IoT).

The first and second radio signals may carry respective copies of a 3GPP transport block.

The radio device may comprise any one or more of: processors, memory for storing software instructions, memory having software instructions stored therein, digital logic, analogue circuitry, DSPs, power supplies, user interfaces, sensors, etc. It may be, or may comprise, an integrated-circuit radio-on-a-chip. The functions described herein may be implemented entirely in hardware, or entirely in software, or by a combination of hardware and software, in any appropriate mixture.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
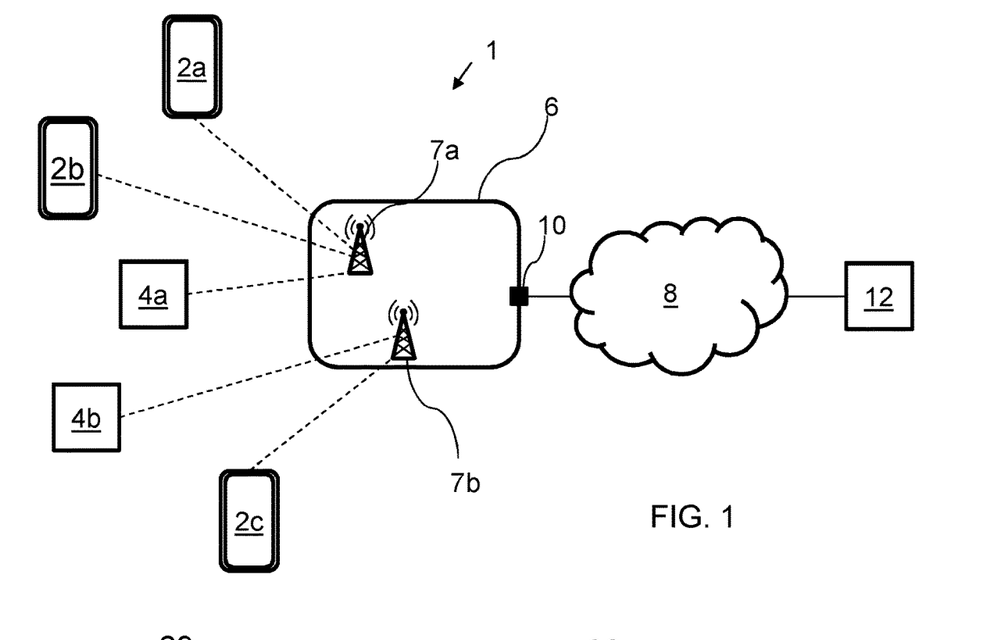
FIG. 1 is a schematic diagram illustrating a typical LTE network embodying the invention.

FIG. 1 is a schematic diagram illustrating a typical LTE system 1 suitable for implementing the invention as disclosed herein. The system 1 includes a number of user equipment (UE) devices, such as LTE-enabled smartphones 2a, 2b, 2c and other LTE M2M devices 4a, 4b, which are arranged to communicate with a cellular telecommunications data network 6 via a number of LTE eNodeB's 7a, 7b. These UE devices 2, 4 may be electronic devices embodying the invention. The cellular telecommunications network 6 (e.g., comprising an Evolved Universal Mobile Telecommunications System (UMTS) Terrestrial Radio Access Network (E-UTRAN) and an Enhanced Packet Core (EPC) network) is connected to the Internet 8 via a gateway 10. An illustrative remote server 12 is shown connected to the Internet 8; this could be connected by a further LTE network or by some other means (e.g., a wired ISP network).

Figure 2:
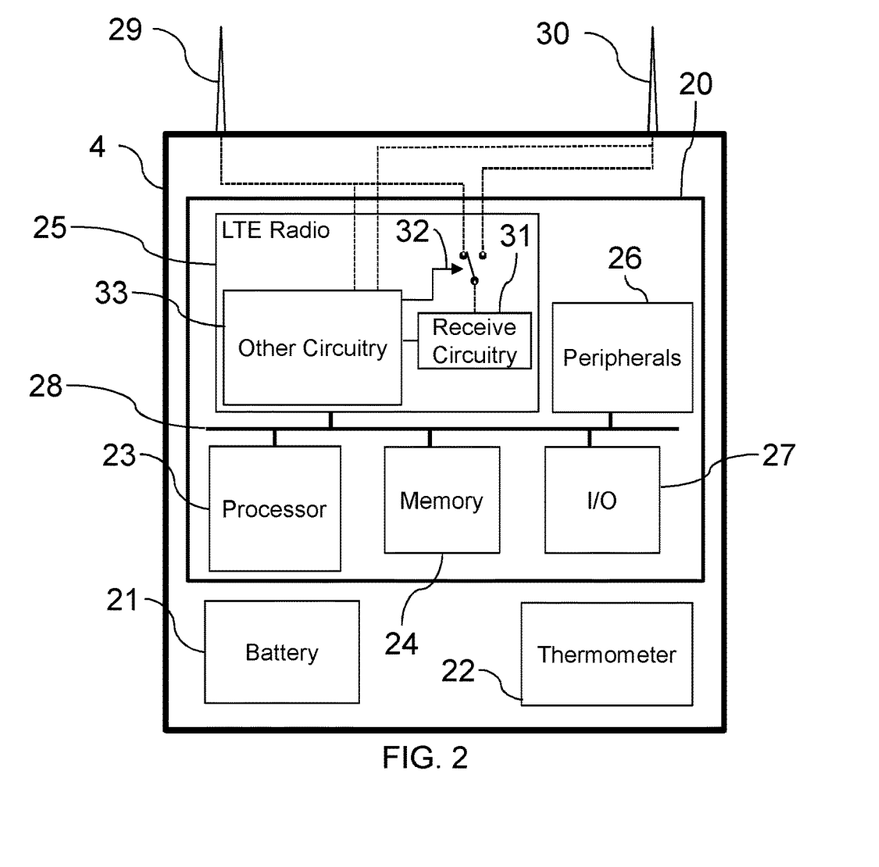
FIG. 2 is a schematic diagram of a wireless temperature sensor device embodying the invention.

FIG. 2 provides more detail of an exemplary M2M device 4 embodying the invention. It shows a wireless temperature sensor 4 which contains an integrated-circuit radio-on-a-chip 20, a battery 21 and a thermometer module 22. It will be appreciated that the sensor device 4 may also contain other components, such as PCBs, oscillators, capacitors, resistors, a housing, user interface features, wiring, etc. which are not shown in FIG. 2 for the sake of simplicity.

The radio-on-a-chip 20 contains a processor 23, memory 24 (which may include volatile and non-volatile memory types), an LTE radio module 25 which supports both the LTE-Cat M1 (LTE-M or eMTC) protocol and the Narrowband Internet-of-Things (NB-IoT) protocol (in any current or future release specification), general peripherals 26 (which may include a hardware cryptography engine, digital-to-analogue converters, timers, etc.) and input/output peripherals 27 (e.g., a USB interface). The radio module 25 does not necessarily support other LTE categories, such as for voice communications. These various radio-on-a-chip 20 elements are all connected to a bus system 28 (e.g., compliant with the Arm™ Advanced Microcontroller Bus Architecture) which supports direct memory access (DMA) to the memory-mapped peripherals 26, 27. In one example, the processor 23 is an Arm™ Cortex™-M series processor, although it could be any type of processor.

The radio module 25 contains digital and analogue logic for processing and communicating radio messages. In FIG. 2 this is shown as being logically divided into receive circuitry 31 and other circuitry 33, although it will be appreciated that this division is conceptual rather than physical. The temperature sensor 4 has a first antenna 29 and a second antenna 30, which are spaced apart. They may be separated by a fraction of a wavelength of a radio signal to which the radio 25 can be tuned (e.g., around half a wavelength or less), or by a wavelength or more. In general, greater separation will lead to better performance, but there are typically physical constraints to how widely separated the antenna 29, 30 can be. They may be oriented parallel or perpendicularly, or in any other appropriate configuration. The receive circuitry 31 is connectable to either the first antenna 29 or the second antenna 30, but not both at the same time, by a switch 32. The switch 32 is represented schematically as a simple single-pole double-throw switch in FIG. 2, but it may be implemented with more complex switching logic (e.g., causing multiple signal paths to be opened or closed, or diverted) and may, in some embodiments, be implemented at least partly in software rather than purely physically. The two antennas 29, 30 may be connected to the switch 32 via appropriate off-chip components (not shown). The antennas 29, 30 are also connected to the other circuitry 33 in the radio 25, which may include transmit circuitry that uses one or both antennas 29, 30 to transmit radio signals. The state of the switch 32 can be controlled by the radio module 25 to determine which antenna 29, 30 is connected to the receive circuitry 31 at any moment.

In some embodiments, the radio module 25 may contain a further general-purpose processor (not shown), such as a further ARM™ core, for implementing some of the radio functionality in software. The sensor 4 may contain other conventional components, such as amplifiers, filters, DSPs, etc., which may be located within or outside the radio module 25 and/or the radio chip 20.

In some embodiments, the sensor 4 may have further antennas connected to the radio module 25, one or more of which may be connectable to the receive circuitry 31. In such cases the switch 32 may be configured for selectively connecting a single antenna to the receive circuitry 31 at a time, or for connecting a controllable subset of the antennas to the receive circuitry 31 at a time.

The receive circuitry 31 includes at least a signal amplifier (e.g., a low-noise amplifier), a mixer, a filter, an analog to digital converter (ADC), for sampling radio signals received by the connected antenna 29, 30, and a demodulator for generated demodulated data from the raw sampled data.

The decoding of the demodulated data is carried out in the other circuitry 33, and makes use of radio signals received from both antennas 29, 30. This enables the decoding to benefit from a gain increase arising from repetitive transmissions of the same data block being received on the different antennas 29, 30. The receive circuitry 31 may pass sampled data to the other circuitry 33 over a bus, or shared memory, or dedicated lines.

The memory 24 stores software which is executed by the processor 23 for controlling the operation of the wireless temperature sensor 4. In use, the processor 23 uses the I/O peripherals 27 to fetch temperature readings from the thermometer module 22 at intervals (e.g., every 15 minutes), and writes these to the memory 24. The processor 23 uses the radio module 25 to send a log of temperature readings to a remote server 12 over the Internet 6 at intervals (e.g., hourly, or daily). The radio module 25 also receives data, such as updated configuration settings, commands, and firmware updates, from the remote server 12, as well as high-level acknowledgements of log data sent by the device 4.

Such downlink (DL) data may be received from the data access network 6 using LTE-M or NB-IoT, as appropriate. In accordance with these protocols, the downlink (DL) radio transaction will typically comprise one or more data transport blocks, each of which may be repeated a predetermined number of times. Where the repetition counts and repetition patterns are configurable, the radio module 25 is configured to receive information regarding these variables in accordance with the relevant protocol.

For example, when using LTE-M, repetition may occur on the LTE Physical Broadcast Channel (PBCH), the MTC Physical Downlink Control Channel (MPDCC) and the Physical Downlink Shared Channel (PDSCH). When using NB-IoT repetition may occur on the Narrowband Physical Broadcast Channel (NPBCH), the Narrowband Physical Downlink Control Channel (NPDCCH) and the Narrowband Physical Downlink Shared Channel (NPDSCH).

When receiving downlink data blocks, the radio module 25 operates the switch 32 to determine which of the antennas 29, 30 (or other antennas, where present) is used for receiving any instance of each transport block. In particular, the switch 32 can be operated so that different repetitive versions of the same data block are received via different receive antennas 29, 30 using a configurable antenna switching pattern. Thus, every DL transport block, when transmitted with repetitions, can benefit from receive antenna diversity provided by the uncorrelated receive antennas 29, 30.

In LTE-M, when frequency hopping is configured for downlink transmission, each frequency hopping pattern may be associated with one or more receive antenna switching patterns. Of course, further factors may also determine which antenna switching pattern is used to receive any particular transmission, or when not to use antenna switching at all.

Figure 3:
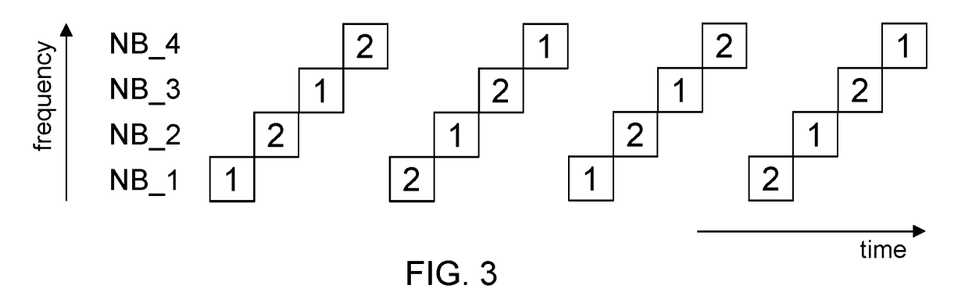
FIG. 3 is a diagram of a first frequency-hopping and antenna-switching pattern used in an embodiment of the invention.

FIG. 3 shows an example of a first antenna switching pattern being used to receive a transport block that is transmitted repetitively (sixteen times in total) using a first frequency hopping pattern. The four rows, NB_1, NB_2, NB_3, NB_4, correspond to four narrowband frequency ranges. Each square is a respective transmission of the same transport block. The numbers, 1, 2, in the squares indicate which antenna 29, 30 is used to receive the respective transport block. In this example, the eNodeB 7 from which the sensor 4 is receiving the transmissions is using a frequency hopping pattern which repeats the block once on each of the four narrowband channels in a cycle. The switch 32 is controlled to alternate between the two antennas 29, 30 on every block instance.

Figure 4:
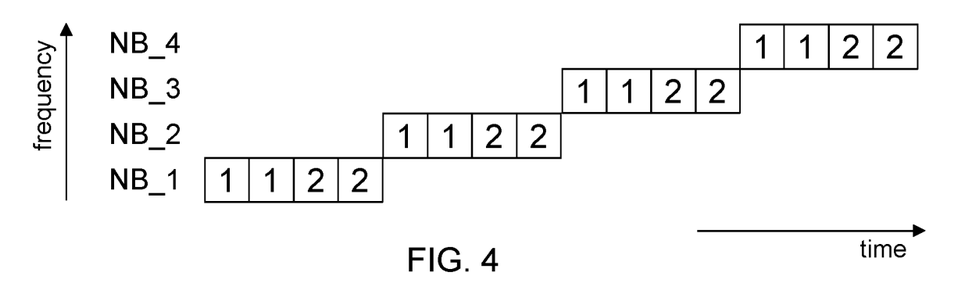
FIG. 4 is a diagram of a second frequency-hopping and antenna-switching pattern used in an embodiment of the invention.

FIG. 4 shows an example of a second antenna switching pattern being used to receive a transport block that is transmitted repetitively (again, sixteen times in total) using a second frequency hopping pattern. In this example, the eNodeB 7 is using a frequency hopping pattern which repeats the block four times on one narrowband channel, for each narrowband channel in turn. In this case, the switch 32 is controlled to alternate between the two antennas 29, 30 on every two block instances.

Of course, many other antenna switching patterns are possible, and the radio module 25 may be configured to use any appropriate switching pattern. It may store information mapping particular frequency hopping patterns to particular antenna switching patterns. It will be appreciated that the antenna switching can be implemented independently of the radio access network 6, which need not know that the radio module 25 is using antenna switching. However, in some implementations (e.g., based on a future version of the LTE-M specification, or when using another radio protocol), the network 6 may be able to guide or instruct the radio module 25 to use a particular switching pattern.

When receiving a transport block, with repetition, but without frequency hopping (e.g., using NB-IoT, or using LTE-M with frequency hopping turned off), all repetitions pertaining to a particular DL transport block will be received in the same frequency band, and such a transmission is not exposed to frequency diversity gain. In such a case, the receive antenna switching diversity gain will typically be much greater than in a frequency hopping case. This is because the negative impact of multipath interference it typically higher in non-frequency-hopping cases, which the antenna diversity can help mitigate.

When receiving a transmission without frequency hopping, the receive antenna switching may be pre-configured or it may be adaptive.

In the first case, the reception of each DL transport block being sent repetitively with N instances is associated with one or more configurable receive antenna switching patterns, where the selected pattern for each reception depends on the parameter N and/or other factors such as the coverage level of the radio module 25.

Figure 5:
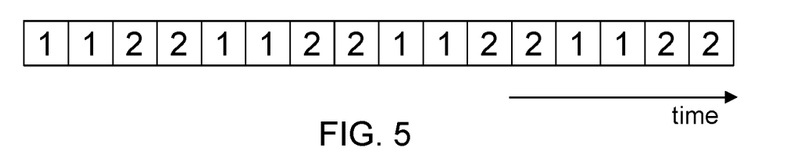
FIG. 5 is a diagram of a single-frequency antenna-switching pattern used in an embodiment of the invention.

FIG. 5 shows an example of the applying receive antenna switching when receiving multiple instances of a transport block in a non-frequency-hopping transmission, using a predetermined switching pattern. In this example, a block is sent sixteen times in the same narrowband channel. The switch 31 is controlled to alternative the antennas 29, 30 every second block instance.

Figure 6:
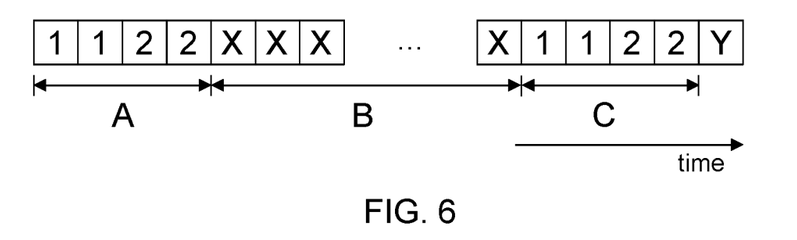
FIG. 6 is a diagram of single-frequency antenna-switching based on periodic antenna measurements, used in an embodiment of the invention.

In the second case, the reception of each DL transport block has a first "measurement" phase during which the receive antennas 29, 30 are switched according to a configured pattern, and the signal level at each receive antenna 29, 39 is measured. This is followed by a "settled" phase during which the receive circuitry 31 is either permanently connected to the receive antenna 29, 30 that had the highest signal level (peak or average, e.g. mean) during the "measurement" phase, for a time, or is switched according to a predefined switching scheme. The predefined switching scheme may be used if neither of the signal levels (or none of the signal levels, if there are more than two antennas) is higher than any other by at least a threshold amount. The durations of the "measurement" and "settled" phases may be configurable. The "measurement" phase may be performed only once per transport block, or may be repeated at intervals over the repetition period of the transport block.

FIG. 6 shows an example of the applying receive antenna switching when receiving multiple instances of a transport block in a non-frequency-hopping transmission, using adaptive switching. In this example, a block is sent multiple times in the same narrowband channel. During a first measurement phase, A, lasting for block instances, the first antenna 29 is connected for two block instances, then the second antenna 30 is connected for two block instances; the signal levels are measured for each antenna 29, 30. Then, during a settled phase, B, the antenna 29, 30 having the higher signal level in the measurement phase, A, is connected to the receive circuitry 31 (i.e., X=1 or 2 for the duration of phase B). This may last until the end of the transport block repeats, or, after a set number of blocks, a second measurement phase, C, may be performed, and whichever antenna 29, 30 then has the higher signal level is used for the another time period (i.e., Y=1 or 2).

It will be appreciated that this principle of adaptive antenna switching may also be applied to frequency-hopping transmissions by measuring signal levels for each antenna 29, 30 on each narrowband, and, where appropriate, for each narrowband, using the respective antenna having the higher signal level for that narrowband to receive block instances during a subsequent "settled" phase.

In all cases, the radio module 25 combines data from some or all the received instances of the repeated transport block. This can be done using conventional techniques. In some embodiments, the other circuitry 33 contains a decoder having a memory buffer. When decoding a transport block, demodulated data from the receive circuitry 31 from a first instance of the transport block, received using one of the antennas 29, 30, is written to the buffer. Subsequent demodulated data corresponding to further instances of the transport block is repeatedly combined with the data already in the buffer through a sample-aligned linear operation. Once all instances of the same transport block have been combined, the decoder decodes the contents of the buffer to determine the transmitted data. In some embodiments, instances received at one antenna 29, 30 may be weighted more heavily than instances received at the other antenna 30, 29—e.g., based on antenna signal-level measurements or other quality metrics. Block instances received during a measurement phase of an adaptive switching mode may be included in the decoding or may be discarded.

Figure 7:
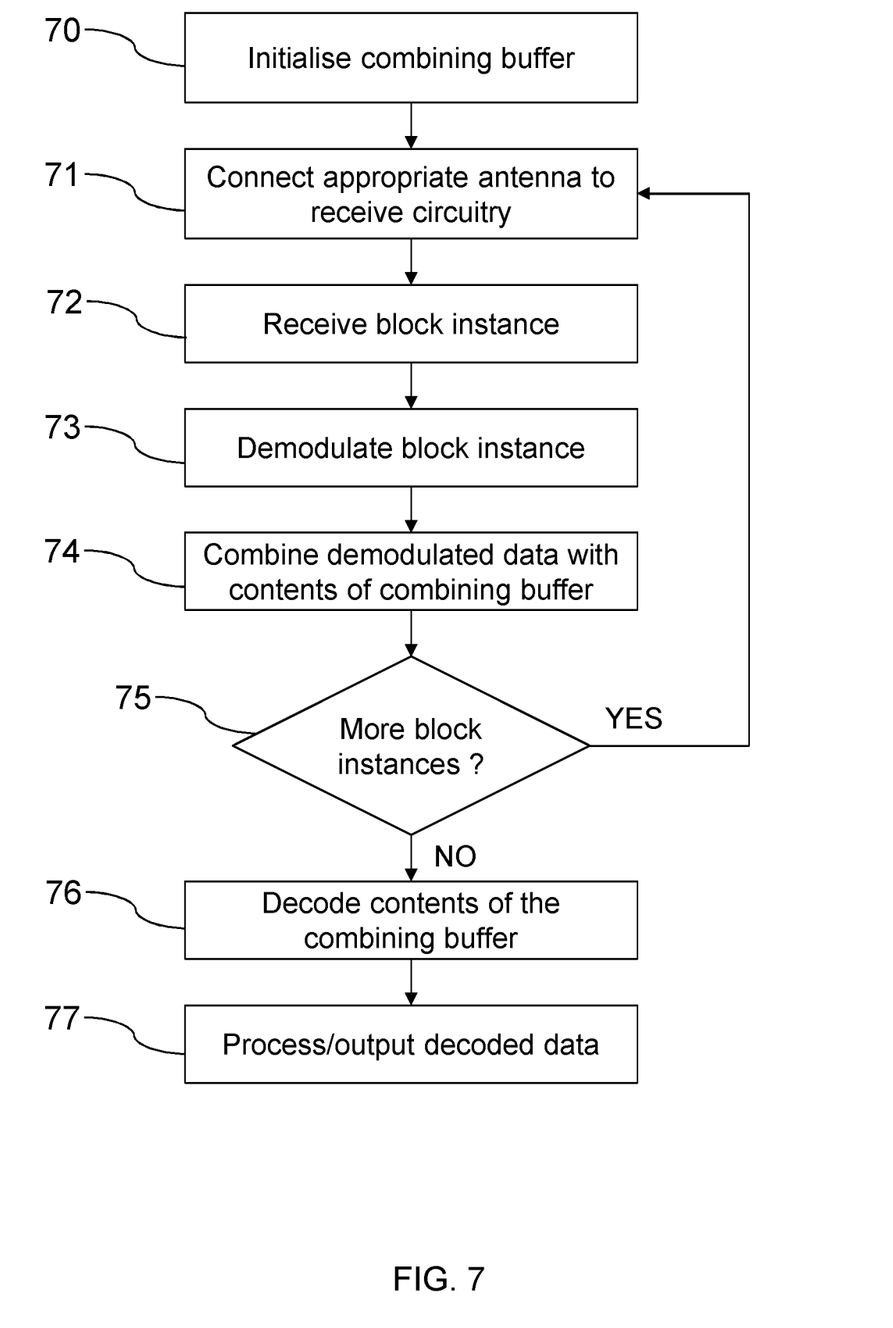
FIG. 7 is a flow chart of operations performed by the radio receiver of the wireless temperature sensor device.

FIG. 7 shows a flow chart of the principal decoding steps implemented by the radio module 25 when a measurement phase is not used. In an initialising step 70, a combining buffer in the decoder in the other circuitry 33 is initialised by being cleared. In a switching step 71, the switch 32 is operated to connect the appropriate antenna 29, 30 to the receive circuitry 31 according to the active switching pattern. In a receiving step 72, a copy of the transport block is received and sampled by the receive circuitry 31. In a demodulating step 73, the receive circuitry 31 demodulates the sampled transport block data and passes the demodulated data to the decoder in the other circuitry. In a combining step 74, the decoder aligns the demodulated data and combines it with the contents of the combining buffer by scaling the demodulated data and summing it with the contents of the buffer. A conditional step 75 determines whether more copies of the transport block are expected. If so, processing loops back to the switching step 71, where the antenna selection may be changed (or may remain the same) according to the active switching pattern. If there are no more instances of the transport block to receive, the decoder decodes the contents of the combining buffer in a decoding step 76. Then, in an output step 77, the decoded data can be sent for further processing within the radio module 25 or output from the radio module 25—e.g., being written to the memory 24 or sent to an I/O peripheral 27. When a measurement phase is used, a signal quality measurement step may be inserted—e.g., between the receiving step 72 and the demodulating step 73—which may be used to modify the switching pattern that is used in the switching step 71.

Figure 8:
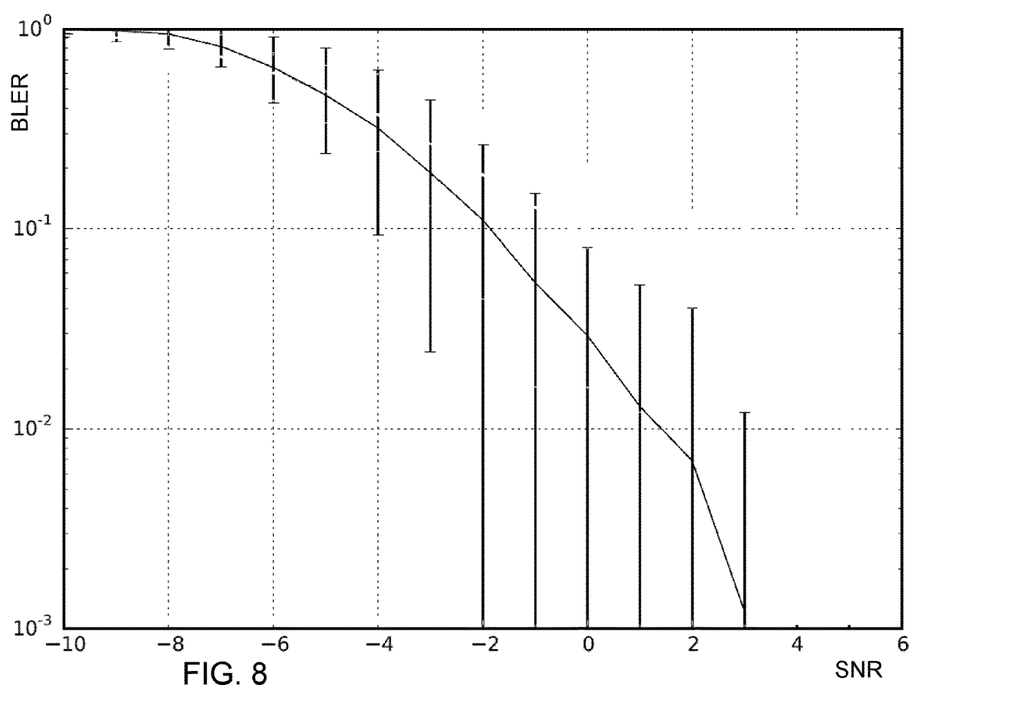
FIG. 8 is a graph of block error rate (BLER) against signal-to-noise ratio (SNR) when using antenna switching in a simulated single-frequency channel.
Figure 9:
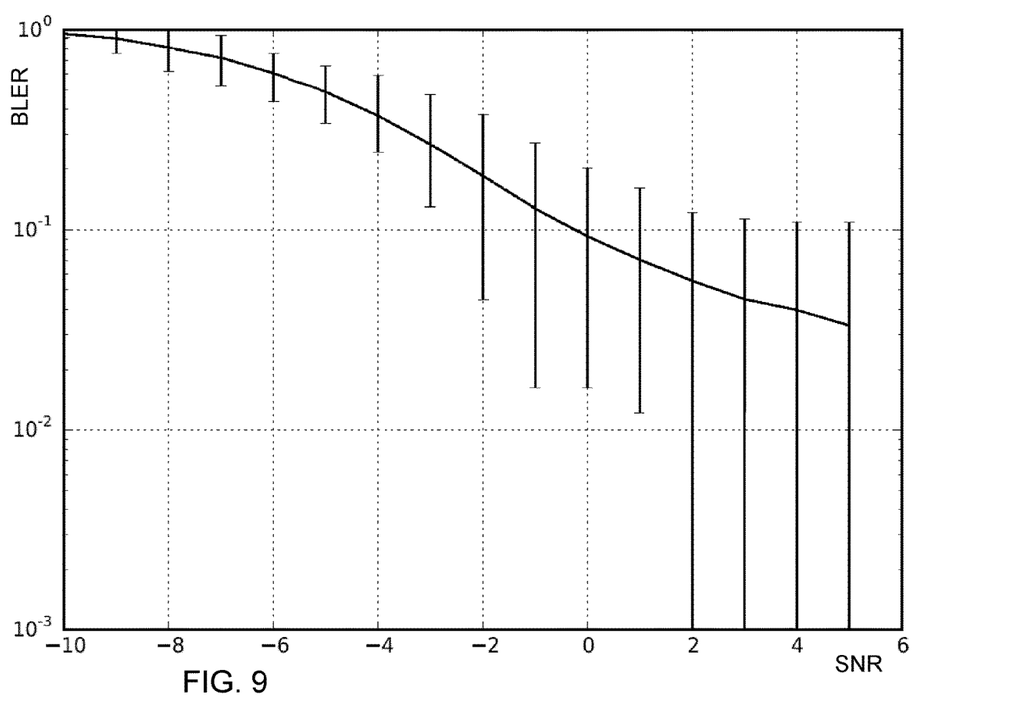
FIG. 9 is a corresponding graph of block error rate (BLER) against signal-to-noise ratio (SNR) with the antenna switching turned off.

FIGS. 8 & 9 show simulated block error rates (BLER) against channel SNR in a non-frequency-hopping, repetitive block transmission in the Physical Downlink Shared Channel (PDSCH) of an LTE-M system, with Modulation Coding Scheme (MCS)=4, number of identical block instances ($N_{Rep}$)=4, and an Extended Typical Urban with UE speed 5 km/h (ETUS) radio channel. The error bars indicate the spread in BLER over a set of simulation runs; the bars are quite wide at high SNR due to the final simulation results being collected from a number of relatively short simulation runs.

In FIG. 8, no antenna switching is performed. In FIG. 9, antenna switching as described herein is turned on. It can be seen that antenna switching can provide up to 2 dB gain in 10% BLER performance.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio device for receiving data from a base station that transmits a first radio signal, carrying a first data block, in a first time window, and transmits a second radio signal, also carrying said first data block, in a second time window, different from the first time window,
    wherein the radio device comprises a first antenna, a second antenna, receive circuitry, and a switch for selectively connecting the receive circuitry to the first antenna or to the second antenna;
    and wherein the radio device is configured to:
        connect the first antenna to the receive circuitry;
        sample the first radio signal, received by the first antenna in the first time window, to generate first sampled data;
        disconnect the first antenna from the receive circuitry and connect the second antenna to the receive circuitry;
        sample the second radio signal, received by the second antenna in the second time window, to generate second sampled data; and
        use both the first sampled data and the second sampled data to decode the first data block;
    and wherein the radio device is configured to use two or more different temporal antenna-switching patterns, and is configured to determine a temporal antenna-switching pattern of the two or more different temporal antenna-switching patterns to use for receiving the first data block in dependence on one or more of: what radio protocol the radio signals are transmitted in accordance with; the timings of the radio signals; the carrier frequencies of the radio signals; a frequency hopping pattern of the radio signals; a signal quality measure for one or more of the radio signals; and a signal quality measure for one or more respective carrier frequencies of the radio signals.

2. The radio device of claim 1, configured to receive the first and second radio signals on different respective carrier frequencies.

3. The radio device of claim 1, wherein the first and second time windows are contiguous time windows.

4. The radio device of claim 1, wherein the first data block is modulated on the first and second radio signals using a common encoding and a common modulation scheme.

5. The radio device of claim 1, wherein the first and second antennas have the same length.

6. The radio device of claim 1, wherein the switch is configured so that only one of the first and second antennas can be connected to the receive circuitry at a time.

7. The radio device of claim 1, configured to receive three or more instances of the first data block, carried on respective radio signals, and configured to receive each radio signal on a respective antenna of a set of antennas that includes the first and second antennas, according to the determined temporal antenna-switching pattern.

8. The radio device of claim 7, configured to evaluate a signal quality measure for each of one or more of the antennas and to determine the temporal antenna-switching pattern at least partly in dependence on the signal quality measure or measures.

9. The radio device of claim 8, configured to identify an antenna of the set of antennas that has a highest signal quality measure, and then to use only the identified antenna to receive a plurality of successive instances of the data block until a final instance of the data block has been received or until a predetermined time period has elapsed or for a predetermined number of instances of the data block.

10. The radio device of claim 9, configured to evaluate the signal quality measure, and identify an antenna having a highest signal quality measure, repeatedly at intervals while receiving radio signals carrying respective instances of the first data block.

11. The radio device of claim 1, comprising:
    a demodulator for demodulating the first sampled data to produce first demodulated data and for demodulating the second sampled data to produce second demodulated data;
    combining circuitry configured to combine the first and second demodulated data according to a linear function to produce combined data; and
    a decoder configured to decode the first data block from the combined data.

12. The radio device of claim 1, configured to receive data from an evolved Node B base station of an LTE (Long Term Evolution) radio access network.

13. A radio system comprising the radio device of claim 1 and a base station, wherein the base station is configured to transmit said first radio signal, carrying said first data block, in said first time window, and transmit said second radio signal, also carrying said first data block, in said second time window, different from the first time window.

14. A method of operating a radio device to receive data from a base station, wherein the base station transmits a first radio signal, carrying a first data block, in a first time window, and transmits a second radio signal, also carrying said first data block, in a second time window, different from the first time window, and wherein the radio device comprises a first antenna, a second antenna, receive circuitry, and a switch for selectively connecting the receive circuitry to the first antenna or to the second antenna, the method comprising the radio device:

connecting the first antenna to the receive circuitry;

sampling the first radio signal, received by the first antenna in the first time window, to generate first sampled data;

disconnecting the first antenna from the receive circuitry and connecting the second antenna to the receive circuitry;

sampling the second radio signal, received by the second antenna in the second time window, to generate second sampled data; and using both the first sampled data and the second sampled data to decode the first data block;

wherein the radio device is configured to use two or more different temporal antenna-switching patterns, and wherein the method further comprises the radio device determining a temporal antenna-switching pattern of the two or more different temporal antenna-switching patterns to use for receiving the first data block in dependence on one or more of: what radio protocol the radio signals are transmitted in accordance with; the timings of the radio signals; the carrier frequencies of the radio signals; a frequency hopping pattern of the radio signals; a signal quality measure for one or more of the radio signals; and a signal quality measure for one or more respective carrier frequencies of the radio signals.

15. The method of claim 14, comprising receiving the first and second radio signals on different respective carrier frequencies.

16. The method of claim 14, comprising receiving each of three or more instances of the first data block, carried on respective radio signals, on a respective antenna of a set of antennas that includes the first and second antennas, according to the determined temporal antenna-switching pattern.

17. The method of claim 14, further comprising:

demodulating the first sampled data to produce first demodulated data;

demodulating the second sampled data to produce second demodulated data;

combining the first and second demodulated data according to a linear function to produce combined data; and decoding the first data block from the combined data.

18. A method of operating a radio system comprising a base station and a radio device, wherein the radio device comprises a first antenna, a second antenna, receive circuitry, and a switch for selectively connecting the receive circuitry to the first antenna or to the second antenna, the method comprising the base station:

transmitting a first radio signal, carrying a first data block, in a first time window; and transmitting a second radio signal, also carrying said first data block, in a second time window, the method further comprising the radio device:

connecting the first antenna to the receive circuitry;

sampling the first radio signal, received by the first antenna in the first time window, to generate first sampled data;

disconnecting the first antenna from the receive circuitry and connecting the second antenna to the receive circuitry;

sampling the second radio signal, received by the second antenna in the second time window, to generate second sampled data; and using both the first sampled data and the second sampled data to decode the first data block;

wherein the radio device is configured to use two or more different temporal antenna-switching patterns, and wherein the method further comprises the radio device determining a temporal antenna-switching pattern of the two or more different temporal antenna-switching patterns to use for receiving the first data block in dependence on one or more of: what radio protocol the radio signals are transmitted in accordance with; the timings of the radio signals; the carrier frequencies of the radio signals; a frequency hopping pattern of the radio signals; a signal quality measure for one or more of the radio signals; and a signal quality measure for one or more respective carrier frequencies of the radio signals.

* * * * *